March 21, 1939.　　C. A. CAMPBELL　　2,151,008
FLUID PRESSURE BRAKE
Filed Jan. 13, 1936
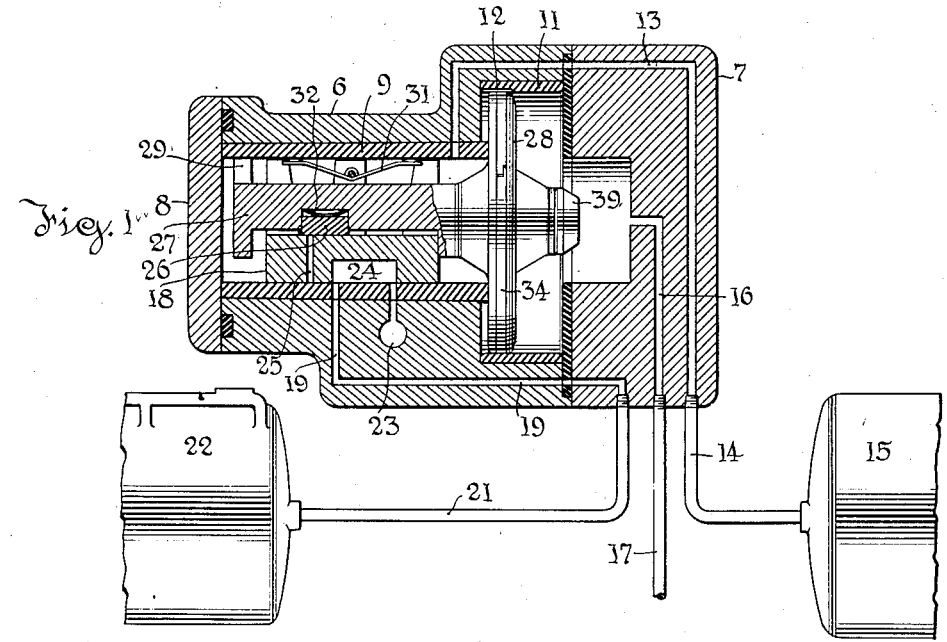
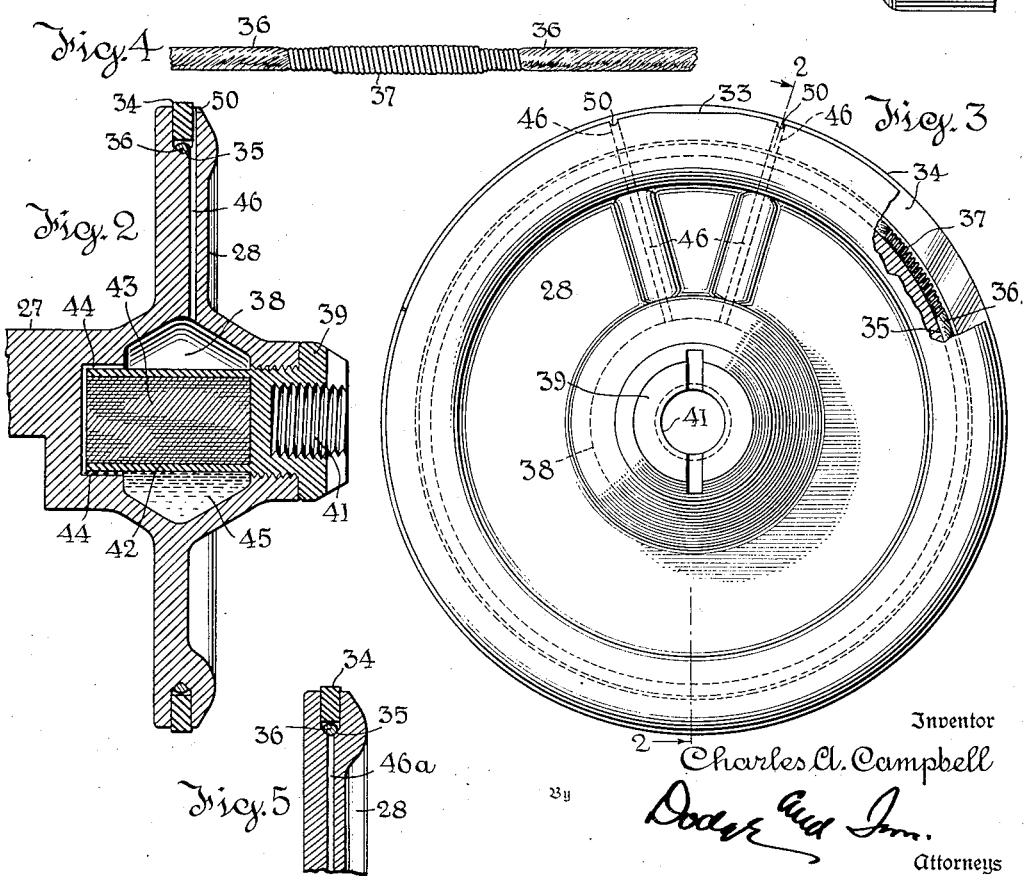
Inventor
Charles A. Campbell
By
Attorneys Patented Mar. 21, 1939

2,151,008

UNITED STATES PATENT OFFICE 2,151,008

FLUID PRESSURE BRAKE

Charles A. Campbell, Watertown, N. Y., assignor to The New York Air Brake Company, a corporation of New Jersey Application January 13, 1936, Serial No. 58,969

8 Claims. (Cl. 184—18)

This invention relates to fluid pressure brakes, and particularly to means for lubricating the piston and piston rings of triple and other automatic brake valves subject to substantial changes of fluid pressure.

In recent years great improvements have been made in protective filtering devices which trap and remove from the air stream, scale, dust and water which enter the brake pipe from the main reservoir, or at other points of entry. As one result of such improvements it has been possible to lengthen the intervals between the periodic inspections and cleaning of triple valves.

Experience with the longer interval between cleanings has not been satisfactory in all cases, because, while the valve remains satisfactorily clean, the lubricating oil customarily applied at the time of assembly, is dissipated in a year or less, whereas the inspection interval should be of the order of three years.

The problem is to provide a lubricating device which may be incorporated in the structure of the highly standardized brake valves, which is simple enough for commercial adoption and which will feed lubricant with certainty and at the necessary slow rate. A slow feed is essential to prevent gumming and to ensure lubrication over the long period required.

The present invention makes use of waste space available in the hubs of conventional triple pistons, emergency valve pistons, and the like, to provide a chamber which serves both as an oil reservoir and as an air surge chamber in which is mounted an absorbent body, such as a roll of cotton gauze. This body is kept saturated with oil by capillary flow and presents a large oil coated surface to air surging into and out of the chamber through one or more surge ports. These ports lead air past and communicate with the point or points where it is desired to deliver oil. These points commonly are the ring groove, and the cylinder bushing at or near the top. Delivery at the top is favorable to gravity distribution. An important feature of the invention is the use of an oil feeding absorbent body in the ring groove beneath the ring.

Such an arrangement can be applied to pistons which respond to pressure variations, and particularly to pistons which separate a reservoir from the brake pipe and control charging of the reservoir from the pipe. Examples of the latter class are triple pistons which are customarily interposed between the brake pipe and a so-called auxiliary reservoir, and emergency pistons which are customarily interposed between the brake pipe and a chamber by some called a quick action chamber and by others called a balancing chamber.

From the standpoint of lubrication the operative principles are essentially similar, and for purpose of disclosing these principles, the invention will now be described as embodied in the piston of a triple valve.

In the drawing—

Fig. 1 shows in vertical axial section a simple form of triple valve connected with brake pipe, brake cylinder and auxiliary reservoir, the piston being shown in elevation.

Fig. 2 is an enlarged axial section through the piston on the line 2—2 of Fig. 3.

Fig. 3 is an elevation of the outer face of the piston with part of the rim broken away to show the packing ring and the underlying absorbent ring.

Fig. 4 is a fragmentary elevation of the absorbent ring and joint on a still larger scale.

Fig. 5 is a fragmentary view similar to a portion of Fig. 2 showing a modification.

Referring first to Fig. 1, the body of a triple valve is indicated at 6, the pipe bracket at 7 and rear cap at 8. In the body is a valve chamber bushing 9, and a cylinder bushing 11, this last having a charging groove 12 located at the top. The space within the valve chamber bushing 9 is connected by passage 13 and pipe 14 with auxiliary reservoir 15. The space within bracket 7 is connected by passage 16 with brake pipe 17.

Within bushing 9 is formed a seat for a main slide valve 18, and formed in this seat is a brake cylinder port 19 connected by pipe 21 with brake cylinder 22 and an exhaust port 23. Formed in slide valve 18 is an exhaust cavity 24 which only in release position connects ports 19 and 23. Leading through valve 18 is a service port 25 which in application position registers with port 19.

Mounted on slide valve 18 and controlling port 25 is a secondary slide valve 26, commonly called a graduating valve. Valve 26 is confined closely in a notch in stem 27 of triple piston 28, whereas valve 18 is allowed some lost motion in a longer notch in stem 27, the lost motion being less than the travel of piston 28. Stem 27 is guided by the piston 28 and by a spider 29 which works in bushing 9. Springs 31 and 32 hold the valves to their seats.

The mechanism so far described will be recognized as a "plain triple valve", and is chosen to illustrate in the simplest practicable way the principles of the invention to be described.

Piston 28 works in bushing 11 and opens feed groove 12 in release position, the edge of the piston being slightly beveled at 33 to facilitate its coaction with the feed groove.

Closely fitted in a peripheral groove in piston 28 is the usual split metallic piston ring 34 (sometimes called a "snap ring"). The bevel 33 extends to the edge of the ring groove. The bottom of the ring groove is formed with a V-shaped channel 35, the middle of the ring groove being somewhat deepened thereby to receive an encircling absorbent cord 36 of cotton or the like.

This cord 36 may be variously formed, but I prefer to connect the ends of the cord by a coil spring 37 whose ends are clamped on the ends of the cord. This produces a ring which may be stretched enough to be snapped into place and yet hug the channel 35. Any arrangement which will hold the cord tight so that it will not interfere with ring 34 may be used.

Formed in the hub of piston 28, which may be somewhat enlarged beyond the present size, within the clearances afforded by the usual body and front cap, is an oil chamber 38, closed by a threaded plug 39. Plug 39 is counterbored and threaded at 41 to receive a piston puller used in disassembling the valve and carries an open-ended cup-like extension 42 which extends across chamber 38 and contains an absorbent mass, preferably a roll of bandage gauze 43, similar to well-known surgical gauze bandages.

The open end of extension 42 freely enters a counterbore in chamber 38 leaving a narrow clearance at 44. When the valve is assembled the absorbent mass 43 is saturated with oil and a small excess of oil 45 is placed in chamber 38. This does not submerge mass 43 or any substantial part thereof, but furnishes oil to maintain saturation, so that mass 43 will offer an extended oil-coated surface to air in chamber 38. Sudden movements of piston 28 cause the oil to surge through passage 44 and feed oil to the gauze. The exposed end of mass 43 is not submerged when such flow occurs because of the throttling effect at 44.

Leading from the top of chamber 38 are two small surge passages 46. As shown in Fig. 2 these are centered in the outer edge of the ring groove, so that they lead not only to groove 35 and cord 36 but offer free passages past the outer face of ring 34 and terminate in small notches 50 cut in the periphery of the piston 28 at the outer side of ring 38. Two passages are used so as to straddle feed groove 12 and thus deliver oil to the working surface of bushing 11 near the top. If the charging groove were otherwise located, say at the bottom, a single passage 46 leading to the top of the piston could be used.

A modified construction shown in Fig. 5 is workable but is considered less desirable. Here passage 46a, similar to passage 46, leads to the bottom of the ring groove, but not past the ring, the fit of the ring being free enough to permit air flow between the ring and side of the groove.

The basis of operation is that brake pipe air surges to and from chamber 38 through passages 46 (or 46a). Since the air in chamber 38 is saturated with oil in the form of vapor or minute droplets, this surging flow carries oil in minute quantities to cord 36, to the ring groove and to the cylinder bushing, so that the ring 34 always works freely in its groove and the piston 28 always works freely in bushing 11.

It will be observed that the slide valves hold the piston against rotation so that the delivery points of the passages 46 (or 46a) are fixed. Delivery of oil in small quantity at frequent intervals to the top of the bushing results in maintained distribution over the entire bushing. The notches 50 assist in insuring delivery at the top by favoring feed to the top of the bushing rather than to the ring groove. This is an important point where the piston axis is horizontal. Where this is not the case, advantage may still be taken of the broad inventive principle by so arranging the surge passage or passages as to enter the oil reservoir above the level of oil therein and so arranging the absorbent body that it is exposed to air in the reservoir chamber and will be fed with oil from the excess in the chamber.

Regardless of position the absorbent cord beneath the piston ring is a useful factor in maintaining even distribution.

The invention has been applied both to the service and to the emergency piston of the A. B. freight brake and tests have demonstrated remarkable utility for the invention. The tendency for grit and dirt to accumulate in the ring groove appears to be virtually eliminated. Rings removed from pistons after a large number of applications and releases show even distribution of oil in the ring groove and free action of the ring in the groove. Stuck rings, a common source of trouble in the past, have been reduced virtually to the point of elimination and this fact has a secondary result of great importance. The tests show that because of the greater freedom of the ring in the groove the ring seats better in the cylinder bushing and acquires a better finish as an incident to the operation of the device, so that the maintained tightness of the piston in its bushing is remarkably improved.

While the invention has been described in considerable detail in connection with a very simple form of triple valve, this description is intended to be illustrative and not limiting.

What is claimed is:

1. In a brake valve, the combination of a piston subject on at least one side to variations of air pressure; a reservoir for liquid lubricant in said piston; an absorbent body in said reservoir exposed above the level of lubricant and adapted to be saturated with lubricant; a piston ring mounted in a groove in the periphery of the piston; means forming a surge port leading from a point in said reservoir above the level of lubricant therein, to said ring groove; and an absorbent body underlying said ring in said groove.

2. In a brake valve, the combination of a piston subject on at least one side to variations of air pressure; a reservoir for liquid lubricant in said piston; an absorbent body in said reservoir exposed above the level of lubricant and adapted to be saturated with lubricant; a piston ring mounted in a groove in the periphery of the piston; means forming a surge port leading from a point in said reservoir above the level of lubricant therein, to said ring groove and to the periphery of said piston; and an absorbent body underlying said ring in said groove.

3. In a fluid pressure brake, the combination of a brake pipe in which the pressure is varied to control the brakes; a reservoir; a piston interposed between said pipe and reservoir and arranged to control a charging flow from the former to the latter past the periphery of the piston; valve means arranged to be operated by the piston and mounted in a chamber interposed in the path of charging flow from the piston to the reservoir; a reservoir for liquid lubricant carried by said piston; lubricant dispersing means in said lubricant reservoir for insuring saturation of air therein with lubricant; and means forming a surge conduit for oil-charged air leading from said lubricant reservoir to the periphery of said piston.

4. In a fluid pressure brake, the combination of a brake pipe in which the pressure is varied to control the brakes; a reservoir; a piston interposed between said pipe and reservoir and arranged to control charging flow from the former to the latter past the periphery of the piston; valve means arranged to be operated by the piston and mounted in a chamber interposed in the path of charging flow from the piston to said reservoir; a reservoir for liquid lubricant carried by said piston; lubricant dispersing means in said lubricant reservoir for insuring saturation of air therein with lubricant; a packing ring mounted in a peripheral groove in said piston; and means forming a surge conduit for oil-charged air leading from said lubricant reservoir to said ring groove.

5. In a fluid pressure brake, the combination of a brake pipe in which the pressure is varied to control the brakes; a reservoir; a piston interposed between said pipe and reservoir and arranged to control charging flow from the former to the latter past the periphery of the piston; valve means arranged to be operated by the piston and mounted in a chamber interposed in the path of charging flow from the piston to said reservoir; a reservoir for liquid lubricant carried by said piston; lubricant dispersing means in said lubricant reservoir for insuring saturation of air therein with lubricant; a packing ring mounted in a peripheral groove in said piston; and means forming a surge conduit for oil-charged air leading from said lubricant reservoir to said ring groove and to the periphery of the piston.

6. In a fluid pressure brake, the combination of a brake pipe in which the pressure is varied to control the brakes; a reservoir; a piston interposed between said pipe and reservoir and arranged to control charging flow from the former to the latter past the periphery of the piston; valve means arranged to be operated by the piston and mounted in a chamber interposed in the path of charging flow from the piston to said reservoir; a reservoir for liquid lubricant carried by said piston; lubricant dispersing means in said lubricant reservoir for insuring saturation of air therein with lubricant; a packing ring mounted in a peripheral groove in said piston; means forming a surge conduit for oil-charged air leading from said lubricant reservoir to said ring groove; and an absorbent body underlying said ring.

7. In a fluid pressure brake, the combination of a brake pipe in which the pressure is varied to control the brakes; an air reservoir; a piston having a normal position, said piston when in said normal position serving to open a charging passage from said pipe to said reservoir past the periphery of the piston; valve means operated by said piston and mounted in a chamber interposed in the path of charging flow from the piston to said reservoir; a reservoir for liquid lubricant; lubricant dispersing means in said lubricant reservoir for insuring saturation of air with lubricant; a packing ring mounted in a peripheral groove in said piston; and means effective at least when said piston is in said normal position to form a surge conduit for oil laden air leading from said lubricant reservoir to said ring groove and to at least a portion of the periphery of said piston.

8. In a brake valve, the combination of a piston subject on at least one side to variations of air pressure; a reservoir for liquid lubricant in said piston; a piston ring mounted in a groove in the periphery of said piston; an absorbent body in said groove underlying said ring; and means forming a surge port leading from a point in said reservoir above the level of lubricant therein to said ring groove, said surge port serving as the sole communication through which pressure variations are communicated to said reservoir.

CHARLES A. CAMPBELL.